United States Patent [19]

Wideman et al.

[11] Patent Number: 5,319,047
[45] Date of Patent: Jun. 7, 1994

[54] PROCESS FOR THE PREPARATION OF MALEIMIDE CONTAINING COMPOUNDS

[75] Inventors: Lawson G. Wideman, Tallmadge; Gordon R. Schorr, Uniontown; George F. Balogh, North Canton; Denise J. Keith, Akron, all of Ohio

[73] Assignee: The Goodyear Tire & Rubber Company, Akron, Ohio

[21] Appl. No.: 112,284

[22] Filed: Aug. 27, 1993

Related U.S. Application Data

[62] Division of Ser. No. 933,126, Aug. 21, 1992, Pat. No. 5,264,472.

[51] Int. Cl.$^5$ .............................................. C08F 20/58
[52] U.S. Cl. ................................... 526/304; 525/218; 526/225; 526/233; 526/234; 526/237; 528/310
[58] Field of Search ............... 526/304, 225, 233, 234, 526/237; 528/310; 525/218

[56] References Cited

U.S. PATENT DOCUMENTS 4,433,114 2/1984 Coran et al. ...................... 525/332.6
5,049,618 9/1991 Wideman et al. ................... 525/136

FOREIGN PATENT DOCUMENTS 3911986 12/1986 Japan.
62-25137 2/1987 Japan.

OTHER PUBLICATIONS

P. O. Tawney et al., "Vulcanization with Maleimides", J. Applied Polymer Sci., 8, 352-366 (Jun. 1964).

*Primary Examiner*—Harold D. Anderson
*Attorney, Agent, or Firm*—Bruce J. Hendricks

[57] ABSTRACT

The present invention relates to a process for the preparation of N-(hydroxyphenyl)maleamic acid and various dimers and oligomers thereof. The process is characterized by heating, in the absence of any solvent, N-(hydroxyphenyl)maleamic acid at a temperature ranging from about 150° to about 250° C. in the presence of an acid catalyst. This unique process avoids the need to recover expensive highly polar solvents. The present invention also relates to use of these maleimide containing compounds in rubber. The use of the blend of hydroxyphenyl maleimide and the various dimers and low molecular weight oligomers impart superior properties to rubber when compared to the use of hydroxyphenyl maleimide alone in rubber.

8 Claims, No Drawings

PROCESS FOR THE PREPARATION OF MALEIMIDE CONTAINING COMPOUNDS

This is a divisional of application Ser. No. 07/933,126, filed on Aug. 21, 1992, presently pending U.S. Pat. No. 5,264,472.

BACKGROUND OF THE INVENTION

Maleamic acids, such as hydroxyphenyl maleamic acid, are disclosed in U.S. Pat. No. 4,433,114 as an additive for use in sulfur vulcanized rubber. In addition N-(4-hydroxyphenyl)maleimide is a known rubber additive as taught in JA 60-163831. These additives are known to improve tack, green strength and/or non-black filler interaction in a diene rubber. Conventionally, N-(4-hydroxyphenyl)maleimide is prepared by reacting aminophenol and maleic anhydride in the presence of large amounts of a highly polar organic solvent, e.g., acetone. After the reaction has proceeded at room temperature for approximately 2 hours, the reaction mixture is heated to 50° C. for an additional 4 hours and then cooled. Acetic anhydride and sodium acetate are then added to the solution and stirred while heating to 50° to 60° for 6 hours. Upon completion of the reaction, the mixture is cooled and water is added to coagulate the product. After filtration and washing with water, the product is dried. Unfortunately, this method is characterized by use of very expensive polar solvents which must then be recovered. With the increase in interest associated with the use of maleimide compounds in rubber, new and more economical methods for their preparation are needed.

SUMMARY OF THE INVENTION

The present invention relates to a process for the preparation of maleimide containing compounds comprising heating, in the absence of any solvent, N-hydroxyphenyl maleamic acid at a temperature ranging from about 150° to about 250° C. in the presence of an acid catalyst.

DETAILED DESCRIPTION OF THE INVENTION

The present invention also relates to a process for preparing rubber compositions by admixing a rubber with the blend of maleimide containing compounds prepared in accordance with the process of the present invention.

The starting material for the process for preparing the maleimide containing compounds is N-(hydroxyphenyl)maleamic acid. The N-(hydroxyphenyl)maleamic acid is heated in the presence of an acid catalyst at a temperature ranging from about 150° to about 250° C. Preferably, the temperature ranges from about 160° to about 220° C.

The heating of the N-(hydroxyphenyl)maleamic acid is conducted in the presence of an acid catalyst. Examples of catalysts that may be used include sulfuric acid, hydrochloric acid phosphoric and toluene sulfonic acid. The amount of catalyst that may be used will vary depending on the particular catalyst that is selected. For example, from about 1 to about 10 percent of the N-(hydroxyphenyl)maleamic acid is recommended.

The reaction may be conducted under a variety of pressures. Pressures ranging from about 0 psig to about 100 psig may be used to conduct the reaction. Preferably, the reaction is conducted at atmospheric or slightly reduced pressure.

The reaction is conducted for a period of time sufficient to produce the desired maleimide containing compounds. In general, the reaction time can vary from minutes to several hours. If the more sluggish reaction conditions are selected, the reaction time will have to be extended until the desired product is produced. It is appreciated that the residence time of the reactant will be influenced by the reaction temperature, concentration and choice of catalyst, total gas pressure, partial pressure exerted by the component and other factors. Desirably, the reaction is conducted until a molar equivalent of water has been removed.

The process for the preparation of the maleimide containing compounds may be carried out in a batch, semi-continuous or continuous manner. The reaction may be conducted in a single reaction zone or in a plurality of reaction zones, in series or in parallel. The reaction may be conducted intermittently or continuously in a elongated tubular zone or in a series of such zones. The material construction of the equipment should be such as to be inert during the reaction. The equipment should also be able to withstand the reaction temperatures and pressures. The reaction zone can be fitted with internal and/or external heat exchangers to control temperature fluctuations. Preferably, an agitation means is available to ensure the uniform reaction. Mixing induced by vibration, shaker, stirrer, rotating, oscillation, etc. are all illustrative of the types of agitation means which are contemplated for use in the present invention. Such agitation means are available and well known to those skilled in the art.

Addition of the product of the process of the present invention enhances the adhesion properties of the vulcanizate.

The product of the process of the present invention contains hydroxyphenyl maleimide as well as various dimers and low molecular weight oligomers of hydroxyphenyl maleimide. GPC analysis has revealed that the molecular weight of the individual components may range from about 240 to upwards to 2200. Generally speaking, the product will contain about 10% to 35% by weight of product having a molecular weight between 248 and 346; 30 to 60% by weight of the product having a molecular weight between 346 and 893 and from 15 to 40% by weight of the product having a molecular weight between 894 and 2200. Preferably, the product will contain about 20% to 25% by weight of product having a molecular weight between 240 and 346; 45 to 48% by weight of the product having a molecular weight between 346 and 893; and from about 25 to 28% by weight having a molecular weight between 894 and 2200.

Addition of this blend or mixture of maleimide compounds to sulfur vulcanizable elastomers as a processing oil surprisingly enhances the adhesion properties of the vulcanizate. The term "rubber" or "elastomer" as used herein embraces both natural rubber and all its various raw and reclaim forms as well as various synthetic rubbers. Representative synthetic elastomers are the homopolymerization products of butadiene and its homologues and derivatives, as for example, methylbutadiene, dimethylbutadiene, chloroprene (neoprene synthetic rubber) and pentadiene as well as copolymers such as those formed from butadiene or its homologues or derivatives with other unsaturated organic compounds. Among the latter are acetylenes, e.g., vinyl acetylene; olefins, for example, isobutylene, which copolymerizes with isoprene to form butyl rubber; vinyl compounds, for example vinylchloride, acrylic acid, acrylonitrile (which polymerizes with butadiene to form NBR), methacrylic acid and styrene, the latter compound polymerizing with butadiene to form SBR, as well as vinyl esters and various unsaturated aldehydes, ketones and ethers, e.g., acrolein, methyl isopropenyl ketone and vinylethyl ether. Also included are the various synthetic rubbers prepared by the homopolymerization of isoprene and the copolymerization of isoprene with other diolefins and various unsaturated organic compounds. Additionally, included are the synthetic rubbers such as 1,4-cis polybutadiene and 1,4-cis polyisoprene and similar synthetic rubbers such as EPDM. The preferred rubbers for use with the blend or mixture of maleimide compounds are natural rubber, polybutadiene, SBR and polyisoprene.

The rubber vulcanizates containing the blend of maleimide compounds may be used in the preparation of tires, motor mounts, rubber bushings, power belts, printing rolls, rubber shoe heels and soles, rubber floor tiles, caster wheels, elastomer seals and gaskets, conveyor belt covers, wringers, hard rubber battery cases, automobile floor mats, mud flaps for trucks, ball mill liners, and the like.

The maleimide containing compounds may be used in a wide variety of proportions in the rubber and may be a substitute, in whole or part for conventional extender or process oils. By the term "extender or process oils", it is meant oils such as aromatic oils, naphthenic oils, paraffinic oils and the like as well as blends thereof. Specific examples of such oils include those largely composed of naphthenic and alkylated naphthenic hydrocarbons and mixtures thereof with various aromatic hydrocarbons. Such oils may be obtained from the high boiling fractions of the so-called naphthenic or mixed crude oils. They may comprise distillate fractions boiling above about 200° C. Suitable fractions are those at least 90 percent of which boil above about 250° C. as more volatile members may be lost during or after compounding and curing the rubber. Generally, the level of the blend of maleimide compounds that may be added to the rubber composition may range from about 1 phr (parts per hundred rubber) to about 50 phr. Preferably the amount of the blend of maleimide compounds that is added ranges from about 2 phr to about 35 phr.

Vulcanization of the rubber is generally carried out at temperatures of between about 100° C. and 200° C. Preferably, the vulcanization is conducted at temperatures ranging from about 110° C. to 180° C. Any of the usual vulcanization processes my be used such as heating in a press or mold, heating with superheated steam or hot air or in a salt bath.

In addition to the blend of maleimide compounds, other rubber additives may also be incorporated in the sulfur vulcanizable material. The additives commonly used in rubber vulcanizates are, for example, carbon black, tackifier resins, processing aids, antioxidants, antiozonants, stearic acid, activators, waxes, oils and peptizing agents. As known to those skilled in the art, depending on the intended use of the sulfur vulcanizable material, certain additives mentioned above are commonly used in conventional amounts. Typical additions of carbon black comprise about 20 to 100 parts by weight of diene rubber (phr), preferably 50 to 70 phr. Typical amounts of tackifier resins comprise about 1 to 10 phr. Typical amounts of processing aids comprise about 1 to 5 phr. Typical amounts of antioxidants comprise 1 to about 10 phr. Typical amounts of antiozonants comprise 1 to about 20 phr. Typical amounts of stearic acid comprise 1 to about 2 phr. Typical amounts of zinc oxide comprise 2 to 5 phr. Typical amounts of silica comprise 0.1 to 20 phr. Typical amounts of waxes comprise 1 to 5 phr. Typical amounts of oils comprise 5 to 30 phr. Typical amounts of peptizers comprise 0.1 to 1 phr. The presence and relative amounts of the above additives are not an aspect of the present invention.

The vulcanization is conducted in the presence of a sulfur vulcanizing agent. Examples of suitable sulfur vulcanizing agents include elemental sulfur (free sulfur) or sulfur donating vulcanizing agents, for example, an amine disulfide, polymeric polysulfide or sulfur olefin adducts. Preferably, the sulfur vulcanizing agent is elemental sulfur. As known to those skilled in the art, sulfur vulcanizing agents are used in an amount ranging from about 0.5 to 8 phr with a range of from 0.5 to 7.0 being preferred.

Accelerators are used to control the time and/or temperature required for vulcanization and to improve the properties of the vulcanizate. In one embodiment, a single accelerator system may be used, i.e., primary accelerator. Conventionally, a primary accelerator is used in amounts ranging from about 0.5 to 3.0 phr. In another embodiment, combinations of two or more accelerators may be used which may consist of a primary accelerator which is generally used in the larger amount (0.5 to 2.0 phr), and a secondary accelerator which is generally used in smaller amounts (0.05–0.50 phr) in order to activate and to improve the properties of the vulcanizate. Combinations of these accelerators have been known to produce a synergistic effect of the final properties and are somewhat better than those produced by use of either accelerator alone. In addition, delayed action accelerators may be used which are not effected by normal processing temperatures but produce satisfactory cures at ordinary vulcanization temperatures. Suitable types of accelerators that may be used in the present invention are amines, disulfides, guanidines, thioureas, thiazoles, thiurams, sulfenamides, dithiocarbamates and xanthates. Preferably, the primary accelerator is a sulfenamide. If a secondary accelerator is used, the secondary accelerator is preferably a guanidine, dithiocarbamate or thiuram compound.

The following examples are presented in order to illustrate but not limit the present invention.

EXAMPLE 1

A two liter glass beaker was equipped with a thermocouple that extends to the bottom of the beaker. The beaker was charged with 100 grams of 4-hydroxyphenyl maleamic acid and 5 grams of p-toluenesulfonic acid. The beaker and contents were heated on a hot plate to 220°–230° C. as water slowly evolved as steam. The contents of the beaker were held at 220°–230° C. until no further signs of steam were noted (~1 hour). The beaker was allowed to cool to room temperature where a dark brown crystalline solid was recovered with a melting range of 140°–200° C., and GPC showing a molecular weight distribution of 2102 (12.1%), 1094 (14.1%), 893 (17.7%), 603 (14.3%), 422 (8.0%), 346 (7.8%), and 248 (25.0%).

EXAMPLE 2

Rubber compositions containing the materials set out in Table I were prepared in a BR Banbury using three separate stages of addition. In addition to the components listed in Table I, conventional amounts of carbon black, antiozonant, antioxidant, rosin, fatty acid, wax, zinc oxide, and processing oil were added to the first Banbury ® stage. Conventional amounts of silica were added to the second Banbury ® stage. Conventional amounts of sulfur and accelerators were added to the compounds during the third stage of mixing. The hydroxyphenyl maleimide or the polyhydroxyphenyl maleimide of Example 1 were added to the Banbury during the first stage of mixing. Table II below sets out the physical data from the two samples.

Peel adhesion testing was done to determine the interfacial adhesion between the rubber formulations that were prepared. The peel adhesion was determined by pulling the compound away from itself at a right angle to the untorn test specimen with the two ends being pulled apart at a 180° angle to each other using an Instron machine. The area of contact was determined from placement of a Mylar sheet between the compounds during cure. A window in the Mylar allowed the two compounds to come into contact with each other during testing.

TABLE I

| Material | Banbury ® Stage | Parts by Weight | | |
|---|---|---|---|---|
| | | Sample 1 | Sample 2 | Sample 3 |
| Natural rubber | 1 & 2 | 50.00 | 50.00 | 50.00 |
| SBR[1] | 1 | 50.00 | 50.00 | 50.00 |
| Hydroxyphenyl-maleimide | 1 | 0.00 | 2.00 | 0.00 |
| Maleimide Compounds of Example 1 | 1 | 0.00 | 0.00 | 2.00 |

[1]Commercially available from The Goodyear Tire & Rubber Company under the designation SLF 1216.

TABLE II

| | Sample 1 No Additive | Sample 2 Hydroxyphenyl maleimide | Sample 3 Polyhydroxyphenyl |
|---|---|---|---|
| Rheometer 150° C. | | | |
| Max. Torque | 33.8 | 32.4 | 31.6 |
| Min. Torque | 9.8 | 10.0 | 10.7 |
| t90, minutes | 18.8 | 18.7 | 18.9 |
| t25, minutes | 10.0 | 9.9 | 9.3 |
| Stress Strain (Original Samples) | | | |
| Tensile Strength (MPa) | 18.5 | 17.9 | 17.0 |
| Elongation at Break (%) | 546 | 568 | 626 |
| 300% Modulus (MPa) | 9.19 | 8.46 | 6.84 |
| Peel Adhesion, 95° C. (Newtons) | 130 | 167 | 190 |

As can be seen from the above data, the peel adhesion value of 190 for the compounds prepared by the process of the present invention are significantly higher than for the compound containing hydrophenylmaleimide or no additive at all. The higher peel adhesion values show increased adhesion of the cured rubber to itself which relates to improved tear resistance.

What is claimed is:

1. A process for the preparation of maleimide containing compounds comprising heating, in the absence of any solvent, N-(hydroxyphenyl)maleamic acid at a temperature ranging from about 150° to about 250° C. in the presence of an acid catalyst.

2. The process of claim 1 wherein from about 1 to about 10 weight percent of the catalyst is present based on the weight of the N-hydroxyphenyl)maleamic acid.

3. The process of claim 1 wherein the temperatures ranges from about 160° to about 220° C.

4. The process of claim 1 wherein said acid catalyst is selected from the group consisting of toluene sulfonic acid, sulfuric acid, hydrochloric acid or phosphoric acid.

5. The maleimide containing compounds which are the product of the process of claim 1.

6. The maleimide containing compounds which are the product of the process of claim 2.

7. The maleimide containing compounds which are the product of the process of claim 3.

8. The maleimide containing compounds which are the product of the process of claim 4.

* * * * *